Patented Sept. 2, 1941

2,254,940

UNITED STATES PATENT OFFICE 2,254,940

RUST PREVENTION

Günther Endres, Hamburg, Germany

No Drawing. Application August 16, 1938, Serial No. 225,249. In Germany September 9, 1937

1 Claim. (Cl. 252—387)

The invention concerns means for rust-prevention and a process for protection against rust-formation by water or mixtures of water with organic solvents.

The surprising fact has been established that organic or inorganic azides can be utilized as means for rust-preventing. Preferably azides are added to solutions, suspensions or emulsions in proportions of about 0.02 to 2.0%. The solutions may comprise water or mixtures of organic liquids, such as alcohols, acetone or the like with water. According to a preferred embodiment of the invention a buffering solution is added to the aqueous azide solution. Advantageously the hydrogen-ion concentration of the azide solution is about or above pH 7. According to a particular embodiment of the present invention phosphate ions are added to the azide solution.

The invention further includes disinfecting agents with rust-preventive action which are characterized by a content of azides.

Example 1

Aqueous azide solutions which contain 0.25, 0.5 and 1.0% of sodium azide, $NaN_3$ were prepared and as comparison liquid tap water of 12° on the German scale of hardness was employed. In each solution carefully degreased iron was dipped as a test body. The rust formation at room temperature was then estimated after 24, 48 and 72 hours respectively. Whereas the test body in the liquid consisting of tap water without azide showed a strong rust formation even after 24 hours, the test body in the sodium azide solutions was completely rust-free even after three days. The rust formation can also be practically completely prevented over longer periods. It was found that the rust formation was suppressed even in a 0.1 to 0.2% sodium azide solution.

Example 2

Corresponding to Example 1, aqueous calcium azide solutions of corresponding contents were prepared and in these solutions steel sheet was dipped. After 48 hours it was found that 0.5 and 1.0% calcium azide solutions completely prevented rust-formation. Even the iron body which had been allowed to stand in a calcium azide solution of 0.25%, showed only a slight corrosion whereas the sheet in tap water without azide addition rusted completely. The same general results were given in investigations with barium azide, $Ba(N_3)_2$ and tetramethylammonium azide $(CH_3)_4.N.N_3$.

Example 3

In similar manner the rust preventive action of solutions of azides such as sodium azide in mixtures of water-miscible organic solvents for example alcohols, such as ethyl alcohol, glycol, glycerine or of acetone or the like consisting of equal parts of water and the organic liquid were investigated and showed that after 72 hours even with concentrations of 0.25% no rust formation was observed.

Example 4

Also solutions with large contents of electrolytes such as salts which, as is known, per se give strong corrosion, lose their aggressive character by an addition of azides according to the present invention. A 2 to 3% solution of cooking salt, sodium siliciate or of triethylbenzylammoniumchloride showed after small additions azides, for example sodium azide, that rusting of iron for practical purpose do not occur, whereas the azide-free salt solutions caused a very strong rust formation.

Example 5

It has been found that the rust preventive action of aqueous azide solutions can be considerably increased if to the solutions buffering materials, advantageously phosphate ions, are added. Use can be made of a buffering solution according to Sörensen which consists of a mixture of 40 ccm. of a 1-molar solution of secondary sodium phosphate ($Na_2HPO_4+2H_2O$) with a 10 ccm. of a 1-molar solution of primary potassium phosphate ($KH_2PO_4$) and which, as is known, shows a pH of 7.3. For carrying out investigations which are set out in the following table a 5% aqueous solution of triethylbenzylammoniumchloride of the formula: $(C_2H_5)_3.C_6H_5CH_2.NCl$ was prepared with graduated additions of sodium azide. There were two series of tests each including four tests of which the series A contained no phosphate while series B, however, contained a phosphate content (pH=7.3) of 0.2 mol. per litre.

|  | A | | | | B | | | |
|---|---|---|---|---|---|---|---|---|
| Triethylbenzylammoniumchloride ..... per cent.. | 5 | 5 | 5 | 5 | 5 | 5 | 5 | 5 |
| Phosphate (Sörenson buffering solution pH=7.3) | | | | | m/5 | m/5 | m/5 | m/5 |
| Sodium azide...per cent.. | 0 | 0.2 | 0.5 | 1.0 | 0 | 0.2 | 0.5 | 1.0 |
| Test 1 | ++ | ++ | + | − | ++ | + | − | − |
| Test 2 | ++ | ++ | ++ | + | ++ | + | − | − |
| Test 3 | ++ | ++ | ++ | ++ | ++ | + | − | − |

Test 1 was carried out with an undiluted solution. According to test 2 a solution according to test 1 was diluted with 10 parts of tap water. Test 3 shows the rust formation with a solution according to test 1 diluted with 50 parts of tap water. The estimations were after 24 hours standing.

In the table:
- − indicates no rust-formation
- + indicates slight rust-formation
- ++ indicates strong rust-formation The results show clearly that in the presence of phosphate the rusting of the iron by additions of small proportions of azides can be strongly suppressed.

*Example 6*

For the investigation of the rust-preventive action, a 5% solution a compound of the following formula:

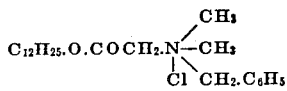

which has an extraordinarily strong bactericidal power, had graduated quantities of sodium azide from 0 to 2% by weight added to it. In the solution degreased test bodies of steel were dipped and after 24 hours the rust-preventive action was estimated. The following results were obtained:

| Quarternary ammonium chloride...........per cent.. | 5 | 5 | 5 | 5 | 5 | 5 |
|---|---|---|---|---|---|---|
| Azide...................per cent.. | 0 | 0.1 | 0.2 | 0.5 | 1.0 | 2.0 |
| Undiluted................. | ++ | ++ | + | − | − | − |
| 1:10 dilution.............. | ++ | ++ | ++ | + | − | − |
| 1:25 dilution.............. | ++ | ++ | ++ | ++ | − | − |

In the table:
- − indicates no rust-formation
- + indicates slight rust-formation
- ++ indicates strong rust-formation Additions of potassium azide, calcium azide or other organic or inorganic salts of nitrogen hydride operate in the same way. Also instead of water mixtures of organic solvents such as alcohol, acetone or other solvents or the like or mixtures with water can be used.

It has further been found that the same action can be obtained with, for example, bactericidal quaternary ammonium salts when these are converted into the corresponding quaternary ammonium azides.

*Example 7*

In a 5% solution of p-chlor-m-cresol in equal parts of alcohol and water sodium azide (0 to 2%) is dissolved and the rust-preventive action examined. In 24 hours the following results are obtained:

| p-chlor-m-cresol (in alcohol-water 1:1).....................percent.. | 5 | 5 | 5 | 5 | 5 |
|---|---|---|---|---|---|
| Azide...................percent.. | 0 | 0.2 | 0.5 | 1.0 | 2.0 |
| Undiluted................. | ++ | − | − | − | − |
| 1:10 diluted............... | ++ | + | − | − | − |
| 1:20 diluted............... | ++ | ++ | ++ | + | − |

It is of great practical importance that with suitable proportioning, azide, for example 5% dilutions of disinfecting agents can be obtained which are practically rust-preventing.

The solutions obtained according to the present invention can be employed in advantageous manner for all purposes in which rust-prevention by water, aqueous solutions, alcohols or the like is to be avoided, for example in cooling liquids for power vehicles or for other coolers, freezing devices, containers, tubular conduits, vessels and the like which serve the purpose of storing or transporting liquids.

Also according to the present invention disinfecting agents with rust-preventive action can be obtained which do not corrode medical instruments and the like, and permit storage and transport in metal containers.

According to the present invention azides of organic or inorganic origin can be employed. The concentrations depend upon the degree of desired rust-prevention, in disinfecting agents upon the nature of the bactericidal material, the solvent, the azides and the buffering solution. In the place of phosphates also other buffering materials such as borates or the like can be employed. The rust-preventive or disinfecting materials according to the invention can be employed in solid form or as solutions, emulsions, suspensions or the like.

I claim:

A non-corrosive aqueous composition comprising an aqueous solution of an electrolyte which alone is corrosive, and a 0.02 to 2% by weight of an azide selected from the group consisting of sodium azide, potassium azide, barium azide and tetramethylammonium azide in which a buffering agent is added having a pH of approximately 7.3.

GÜNTHER ENDRES.